Patented Aug. 27, 1940

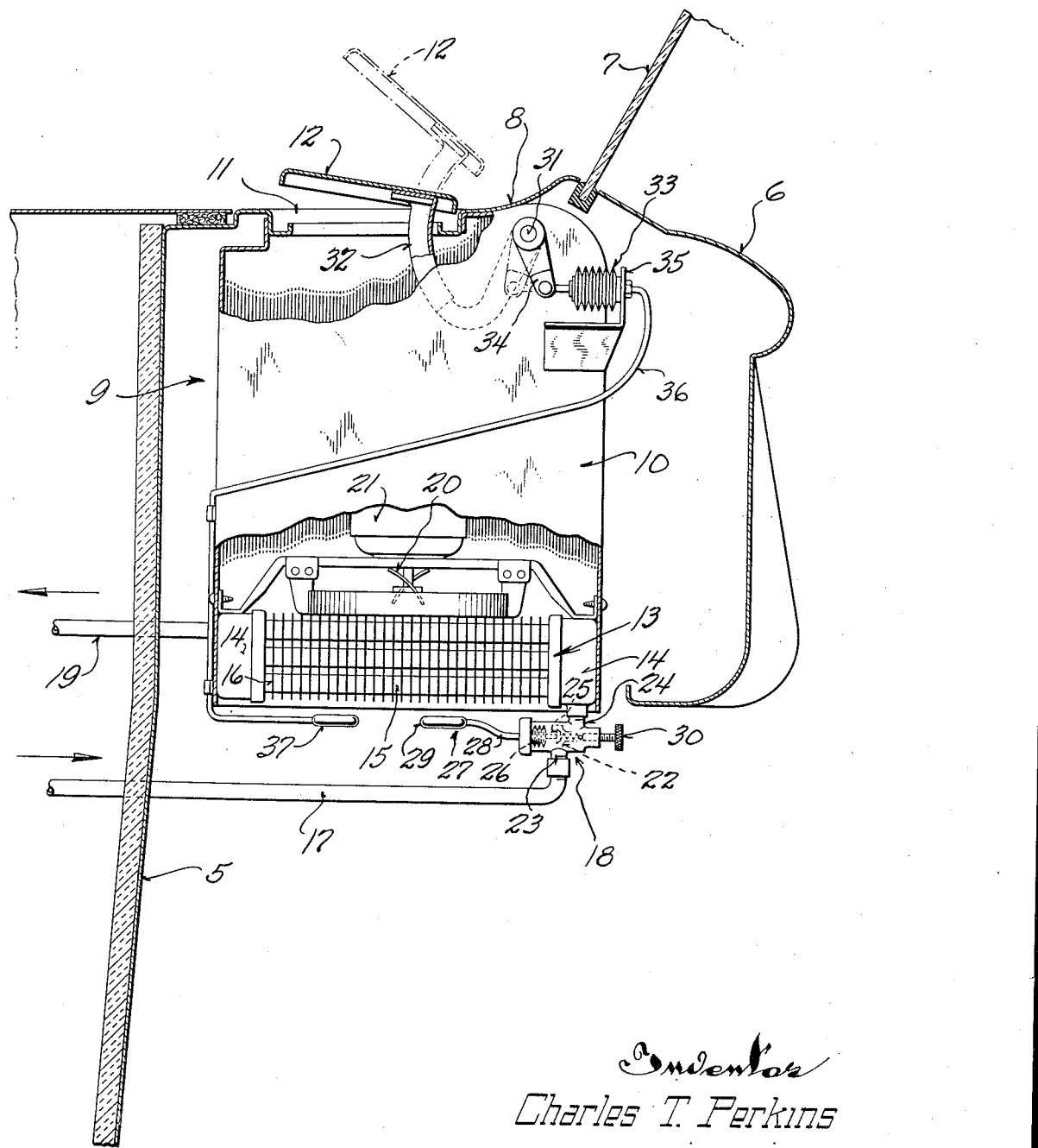

2,213,018

UNITED STATES PATENT OFFICE 2,213,018

AIR CONDITIONER FOR AUTOMOBILES

Charles T. Perkins, Racine, Wis., assignor to Modine Manufacturing Company, Racine, Wis., a corporation of Wisconsin Application June 9, 1938, Serial No. 212,619

6 Claims. (Cl. 236—38)

This invention relates to air conditioners for automobiles, and refers particularly to an air conditioner of the type illustrated in the co-pending application of Charles T. Perkins, Serial No. 169,397, filed October 16, 1937, for Air conditioning means for automobiles.

In air conditioners of this type, outside air is taken into the automobile body through an opening in the cowl and this air, after having precipitation removed therefrom and after being filtered, passes through a heat exchanger to be discharged therefrom into the interior of the body.

The comfort of the occupants is, of course, the primary consideration in any automobile heater or air conditioner. Actual tests have established that this desideratum is achieved when the temperature of the air issuing from the heat exchanger is maintained at between 90° and 100° F.; and while means were provided in the air conditioners heretofore in use for manually regulating the factors determinative of the temperature of the air issuing from the heat exchanger, the many variables encountered made it difficult to maintain the desired temperature conditions with these expedients. Thermostatically controlled mechanism for regulating the volume of air entering the inlet opening in the cowl was a natural suggestion of the problem. Such a control is illustrated in the patent to James L. Breese, No. 2,060,923, issued November 17, 1936, for Air conditioning system for motor vehicle bodies.

Control of the volume of air entering the air inlet opening of itself, however, does not meet the problem, for there are obviously conditions even when the inlet opening is fully open and the air is passing through the heat exchanger at maximum velocity that the temperature will be higher than desired.

This invention, therefore, has as one of its objects to provide a complete thermostatic control for an air conditioner of the character described whereby the maintenance of a predetermined temperature for the air issuing from the heat exchanger can be assured.

The temperature of the air issuing from the heat exchanger with which the conditioner of this invention is equipped, is dependent upon two factors, namely, the velocity at which the air passes through the heat exchanger and the effectiveness of the heat exchanger. It is obvious that when air passes through a heat exchanger at a low velocity, it attains a higher temperature than when the air is moving therethrough at a higher velocity.

The velocity of the air passing through the heat exchanger is a function of the speed of the automobile, the direction and velocity of the wind, the extent to which the inlet for the air is open, and the nature of the provisions for exhausting the air from the car. At relatively high car air speeds, it is apparent that the velocity for the inflowing air may be the same with a small inlet opening as with a large inlet opening at lower car air speeds. The velocity at which the air enters and passes through the heat exchanger thus is highly variable, which makes control for this factor necessary.

As noted hereinbefore, control of the velocity of the air passing through the heat exchanger alone does not solve the problem of maintaining a uniform predetermined temperature for the air issuing from the heat exchanger regardless of outdoor weather conditions, for there are instances when, even with maximum velocity for the airflow through the heat exchanger that the temperature of the air introduced into the automobile is higher than desired.

To this end, this invention contemplates means for automatically decreasing the effectiveness of the heat exchanger under such conditions, this being accomplished by means of a valve controlling the supply of temperature modifying medium to the heat exchanger.

While the conditioner unit of this invention is equipped with a fan for forcing the air through the heat exchanger, it is desired to point out that the fan is seldom used, and that at nearly all times, even in severe cold weather, the air inlet is partially open.

This is an essential of proper operation, for it is only by maintaining a plenum of air in the automobile that the desired uniform temperature distribution is obtained. By taking in outside air at all times, the pressure of the air inside the passenger compartment of the automobile is slightly above atmospheric so that there is a constant exfiltration of air through the cracks and openings in the car body, and as a consequence, there are no cold drafts to interfere with uniform temperature distribution.

More specifically, it is therefore an object of this invention to provide not only a thermostatic control for regulating the veocity of the air entering the car body, but also a thermostatic control for regulating the flow of temperature modifying medium to the heat exchanger and to coordinate these controls so that they function together to produce the desired result.

Another object of this invention is to provide an air conditioner for automobiles which is in the form of a compact unit positioned under the cowl of an automobile so that air is taken into it through the usual cowl ventilator opening and wherein the door for closing the ventilator opening which acts as a throttle to regulate the velocity of the air flowing through the heat exchanger, and also the flow of temperature modifying medium to the heat exchanger of the unit are controllable.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claim.

The accompanying drawing illustrates one complete example of the physical embodiment of the invention constructed according to the best mode so far devised for the practical application of the principles thereof, and in which the single figure is a vertical sectional view through a portion of an automobile body illustrating the application of this invention thereto.

Referring now particularly to the accompanying drawing, in which like numerals indicate like parts, the numeral 5 designates the dashboard of an automobile which, as is well known, separates the engine compartment from the passenger compartment of the automobile. At a distance from the dashboard is an instrument panel 6, from the upper edge of which a windshield 7 extends, and spanning the distance between the dashboard and the windshield is the cowl 8 of the automobile.

Between the dashboard and the instrument panel and beneath the cowl is an air conditioner unit indicated generally by the numeral 9. This unit comprises a box-like housing 10 shaped to have its upper portion fitted to the underside of the cowl so that air may be taken into it through an air inlet opening 11 in the cowl. This air inlet opening is adapted to be closed by a movable door 12.

Extending across the lower portion of the box-like housing 10 is a heat exchanger 13 of conventional construction having headers 14 joined by tubes 15 on which fins 16 are mounted. Temperature modifying medium is supplied to the header nearest the instrument panel through a supply pipe 17, which is connected with said header through a control valve 18. The other header has a return pipe 19 connected thereto to carry the temperature modifying medium back to its source.

When the conditioner is used for winter heating, the temperature modifying medium is a heating medium which is conveniently supplied from the cooling system of the engine, the pipes 17 and 19 being connected therewith in the customary manner.

Whenever the automobile is in motion, the throttle door 12 should be open, at least partially, regardless of what the temperature of the outside air may be, as satisfactory operation of the conditioner requires maintaining a plenum of air in the automobile. The heat exchanger thus has sufficient capacity to give the air entering the conditioner the desired temperature even with an extreme temperature differential between the outside air and the temperature at which it is desired to have the air enter the interior of the automobile.

When the automobile is standing still, the desired flow of air into the conditioner through its inlet opening 11 must be induced artificially and to this end, a fan 20 is provided driven by an electric motor 21. The fan is mounted above the heat exchanger, as shown, and may be turned on at will by a conventional switch (not shown).

The fan is also useful where a heavy tail wind is encountered, for in such instances, the speed of the car may not be sufficient to insure an adequate influx of air.

While in actual practice, baffle means are provided inside the conditioner for removing precipitation from the air entering the inlet opening and a filter is also provided to cleanse the air prior to its passage through the heat exchanger, these features do not form any part of the present invention, and therefore for the sake of clarity have been omitted. For a disclosure of these parts, reference may be had to the co-pending application of Charles T. Perkins, Serial No. 212,618, filed June 9, 1938, for Air conditioner for automobiles.

The valve 18, which controls the flow of temperature modifying medium to the heat exchanger, comprises a suitable casing having a valve seat 22 therein between its inlet 23 and its outlet 24. This valve seat is adapted to receive a valve disk 25 to close off the flow of fluid through the valve. The valve disk is actuated and controlled by a bellows 26 of the "Sylphon" type with which a thermostatic control element 27 is connected.

This thermostatic control element may be of any suitable type, but preferably comprises a tube 28 having one end connected to the "Sylphon" bellows 26, and its other end terminating in a temperature responsive element 29 which may be considered the antenna of the control. An expansible fluid fills the tube and the "Sylphon" bellows so that upon a rise in temperature at the antenna 29, the "Sylphon" bellows is expanded to close the valve.

The temperature at which complete closure of the valve is effected may be determined by a manually operable adjusting screw 30 which controls a compression spring interposed between the end of the adjusting screw and the valve disk. Obviously, increasing the compression of the spring raises the point at which the valve closes and vice versa.

Hence it will be seen that through the medium of the thermostatic control for the valve 18, it is possible to regulate or control the flow of temperature modifying medium to the heat exchanger; but this, of itself, is not sufficient to provide a complete control for the conditioner.

In addition, a thermostatic control for the throttle door 12 is provided to open and close the same as required to insure the proper velocity for the air passing through the heat exchanger. To this end the cross shaft 31, to which the arms 32 which carry the throttle door 12 are secured, is connected with another "Sylphon" bellows 33 through a lever 34. The opposite end of the "Sylphon" bellows is anchored to a bracket 35 fixed to the housing of the conditioner and has a tube 36 connected therewith, the opposite end of which has an antenna element 37 similar to the element 29 positioned under the heat exchanger to lie in the path of air issuing therefrom.

The expansion of the fluid contained within the tube 36 and the "Sylphon" bellows opens the throttle door and contraction of this fluid effects closure of the door. Thus, it will be seen that the temperature of the air issuing from the heat exchanger controls both the velocity of air flowing through the conditioner, and the flow of the temperature modifying medium to the heat exchanger.

The two thermostatic controls are so related and coordinated that they function jointly and interdependently to effect the desired temperature regulation. To illustrate: assume that it is desired to maintain the temperature of the air issuing from the heat exchanger at 95°, which, as hereinbefore noted, is desirable from a standpoint of comfort to the occupants of the automobile.

Assume also that under the prevailing conditions of car speed and wind direction, five hundred cubic feet of air per minute are taken into the conditioner through the air inlet when the throttle door 12 is fully open.

Assume further that the heat exchanger has a capacity of seventy degrees, or in other words, is able to raise the temperature of air passing through it at the stated velocity of five hundred cubic feet per minute, seventy degrees.

To complete the picture, assume further that the outside temperature is thirty degrees Fahrenheit.

With this set of conditions, the air throttle, which is the door 12, is one hundred per cent open, allowing five hundred cubic feet of air per minute to flow through the heat exchanger. At this velocity, the capacity of the heat exchanger would raise the temperature of the air seventy degrees, which, added to the thirty degrees of outside temperature, results in one hundred degrees at the heat exchanger, or an excess of five degrees above the temperature desired.

To correct this objectionable condition, the water throttle, which is the valve 18, is actuated in response to its thermostatic control to reduce the flow of heating medium to the heat exchanger sufficiently to bring its efficacy down to the point at which the air issuing from the heat exchanger will be just ninety-five degrees in temperature. With the figures as given, the valve 18 will be adjusted to ninety-three per cent open to bring about the desired drop in effectiveness of the heat exchanger.

If now, the outside temperature, which is of course a variable factor, drops down to fifteen degrees Fahrenheit, then in that event, with air flowing through the heat exchanger at five hundred cubic feet per minute and being heated seventy degrees (which would entail having the water throttle open one hundred per cent), a temperature rise of seventy degrees would be effected from fifteen degrees to eighty-five degrees, but this would be ten degrees less than desired.

Inasmuch as the heat exchanger is already operating at one hundred per cent capacity, correction cannot be effected at this point. Hence, the thermostatic control for the air throttle functions to reduce the velocity of air-flow an appropriate amount, and as a ten degree temperature increase is required, the air throttle will be reduced to eighty-seven and one-half per cent open with the consequent reduction in velocity from five hundred cubic feet per minute to four hundred and thirty-five cubic feet per minute.

Similarly, if the outside temperature drops to zero, the water throttle would remain open one hundred per cent, but the air throttle would have to close to seventy-two per cent open to reduce the velocity to three hundred and sixty cubic feet per minute.

So that these values and the relationship which they bear to each other can be more easily comprehended, they have been set up in the following comparative table:

| Air outside temperature | Air velocity in c. f. m. | Air throttle | Water throttle |
|---|---|---|---|
| ° F. | | Percent | Percent |
| 30 | 500 | 100 | 93 |
| 15 | 435 | 87½ | 100 |
| 0 | 360 | 72 | 100 |

All of the above values are based upon a constant car speed and unchanging wind conditions, but it will be readily apparent that the speed of the automobile and also its direction with relation to the direction of the wind, and also the velocity of the wind per se are constantly variable factors, which show the necessity for constant control of the air throttle and water throttle to maintain the air issuing from the heat exchanger at a predetermined desirable temperature.

It is important to note that the velocity of the air-flow through the heat exchanger in addition to the regulation of its capacity are the factors determinative of the temperature of the air issuing from the heat exchanger. This, of course, means that the volume of air being introduced into the interior of the automobile is constantly fluctuating, but as long as some air is taken into the automobile so that a plenum exists therein, fluctuations of this nature are not objectionable.

As noted hereinbefore, there are times at which an influx of air cannot be produced naturally, that is, in a case where the automobile is traveling with a heavy tail wind, its air speed may be negligible and insufficient to insure the proper velocity for the air flowing through the heat exchanger. At such times, the motor driven fan 20 is employed to augment the forward motion of the car to insure the proper influx of air.

Likewise, when the automobile is standing still, unless it is pointed into the wind, it is necessary to employ the fan 20 to insure the maintenance of the necessary velocity through the heat exchanger.

It is also desired to point out that the two controls are so related that the air throttle is always set to the position at which the velocity is such that the heat exchanger can cope with the air flowing therethrough to bring the same to the desired temperature.

Thus, it will be seen that the velocity of the air entering the inlet opening 11 and flowing through the heat exchanger is inversely proportional to the differential in the temperature of the outside air and the temperature desired for the interior of the car body; and that only through the joint action of the two controls is it possible to properly maintain a predetermined uniform temperature for the air entering the passenger compartment.

While the thermostatic controls have been shown and described as "Sylphon" bellows, it will be readily apparent that other forms of thermostats may be employed without deviating from the scope of the invention, and also that one or the other of the thermostatic controls, and particularly the thermostatic control for the throttle door which controls the velocity of the air flowing through the heat exchanger, may be manual. It is to be appreciated, though, that the substitution of a manual control for either one of the thermostatic controls will result in less satisfactory operation.

What I claim as my invention is:

1. An air conditioner for automobiles having a passenger compartment, one wall of which has an air inlet opening so located that forward motion of the automobile effects an influx of air through said opening: a heat exchanger; means for conducting the outside air entering said inlet opening to the heat exchanger to cause the same to flow therethrough and into the passenger compartment; means for supplying a temperature modifying medium to the heat exchanger; means governed by the temperature of the air discharged from the heat exchanger for controlling the flow of temperature modifying medium to the heat exchanger; and means also governed by the temperature of the air issuing from the heat exchanger for regulating the velocity of the air flowing through the heat exchanger, said two last named means being set so that the latter functions in response to a lower temperature than the former so as to maintain a maximum velocity of air flowing through the heat exchanger during operation of the conditioner.

2. In an air conditioner for automobiles having a passenger compartment: a heat exchanger; means for causing outside air to flow through the heat exchanger and into the passenger compartment; means for supplying the heat exchanger with a fluid temperature modifying medium; a valve for regulating the flow of temperature modifying medium to the heat exchanger; thermostatic means governed by the temperature of the air issuing from the heat exchanger for directly actuating said valve so that the flow of temperature modifying medium to the heat exchanger is controlled by said thermostatic means; and other thermostatic means entirely independent of said first named thermostatic means but also governed by the temperature of the air issuing from the heat exchanger for regulating the velocity at which outside air flows through the heat exchanger, said two thermostatic means being set so that the latter becomes effective in response to a rise in the temperature of the air issuing from the heat exchanger in advance of the former to effect an increase in the velocity of air-flow through the heat exchanger prior to actuation of the valve by the former to reduce the flow of temperature modifying medium to the heat exchanger.

3. In an air conditioner for automobiles having a passenger compartment: a heat exchanger; means for causing outside air to flow through the heat exchanger and into the passenger compartment; means for supplying a temperature modifying medium to the heat exchanger; a thermostatically controlled valve for regulating the flow of temperature modifying medium to the heat exchanger having an antenna positioned in the path of air discharging from the heat exchanger and set to reduce the flow of temperature modifying medium to the heat exchanger whenever the temperature of said air issuing from the heat exchanger exceeds a predetermined value; means for regulating the velocity of the air-flow through the heat exchanger; and another thermostatic control having an antenna likewise positioned in the path of air issuing from the heat exchanger and operable upon said last named means to control the same and set to decrease the velocity of the air-flow through the heat exchanger whenever the air issuing from the heat exchanger has a temperature several degrees lower than said predetermined temperature and less.

4. In an automobile air conditioner of the character described comprising: a housing having an inlet opening; a door for closing the opening; a heat exchanger in the housing through which air which passes through the inlet opening flows; means for supplying a temperature modifying medium to the heat exchanger; a valve for regulating the flow of temperature modifying medium to the heat exchanger; two thermostatic elements, each having an antenna positioned directly adjacent to the heat exchanger so as to be in the path of air issuing from the heat exchanger and each comprising a tube containing a fluid expansible in response to a temperature rise; means operable by the expansion of the fluid in one of said tubes for closing the valve; and means operable by the expansion of fluid in the other of said tubes for opening the door; said thermostatic elements being so related that it requires a higher temperature for the air issuing from the heat exchanger to close the valve than it does to open the door.

5. In combination: an automobile having an air inlet in one of its outside walls so located that forward motion of the automobile results in an influx of air through said inlet opening; a heat exchanger; means for conducting the air from the inlet opening to the heat exchanger so that air taken in through said opening flows through the heat exchanger; said heat exchanger discharging into the passenger compartment of the automobile; means for supplying a temperature modifying medium to the heat exchanger; means having a temperature responsive part adjacent to the discharge of the heat exchanger for automatically controlling the flow of the temperature modifying medium to the heat exchanger; and means having a temperature responsive part adjacent to the discharge of the heat exchanger for automatically controlling the velocity of the air flowing through the heat exchanger, said last two means being so coordinated as to maintain the air issuing from the heat exchanger at a predetermined temperature, said air velocity controlling means being operable in response to a lower temperature than the means for automatically controlling the flow of temperature modifying medium to the heat exchanger so that a maximum velocity and volume of air is passed through the heat exchanger at all times.

6. In combination: an automobile having an opening in one of its outside walls so located that forward motion of the automobile results in an influx of air through said opening; a duct to receive the air entering the inlet opening and arranged to discharge the same into the passenger compartment of the automobile; a heat exchanger in said duct through which the air entering the inlet opening flows in its passage to the passenger compartment; thermostatically governed means for automatically regulating the efficacy of the heat exchanger; and thermostatically governed means for automatically regulating the velocity of the air flowing through the heat exchanger, said two thermostatically governed means being coordinated to maintain the air entering the passenger compartment at a predetermined temperature and having antennae directly adjacent to each other to be subjected to the same temperature at all times, and said velocity controlling means being operable in response to a lower temperature than the means for controlling the efficacy of the heat exchanger so that a maximum velocity and volume of air is passed through the heat exchanger at all times.

CHARLES T. PERKINS.